Aug. 28, 1962    J. BECKER ET AL    3,050,854
ROTARY HEDGE TRIMMER
Filed Jan. 12, 1961
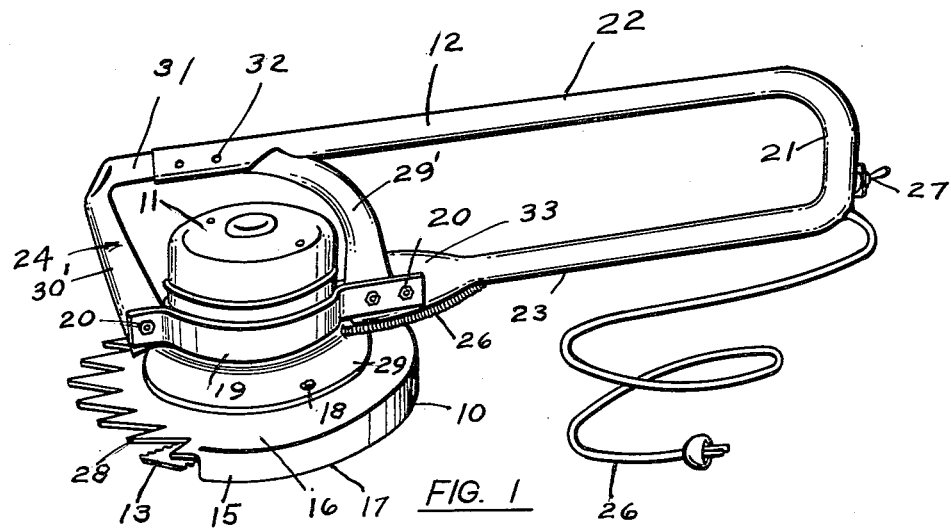
FIG. 1
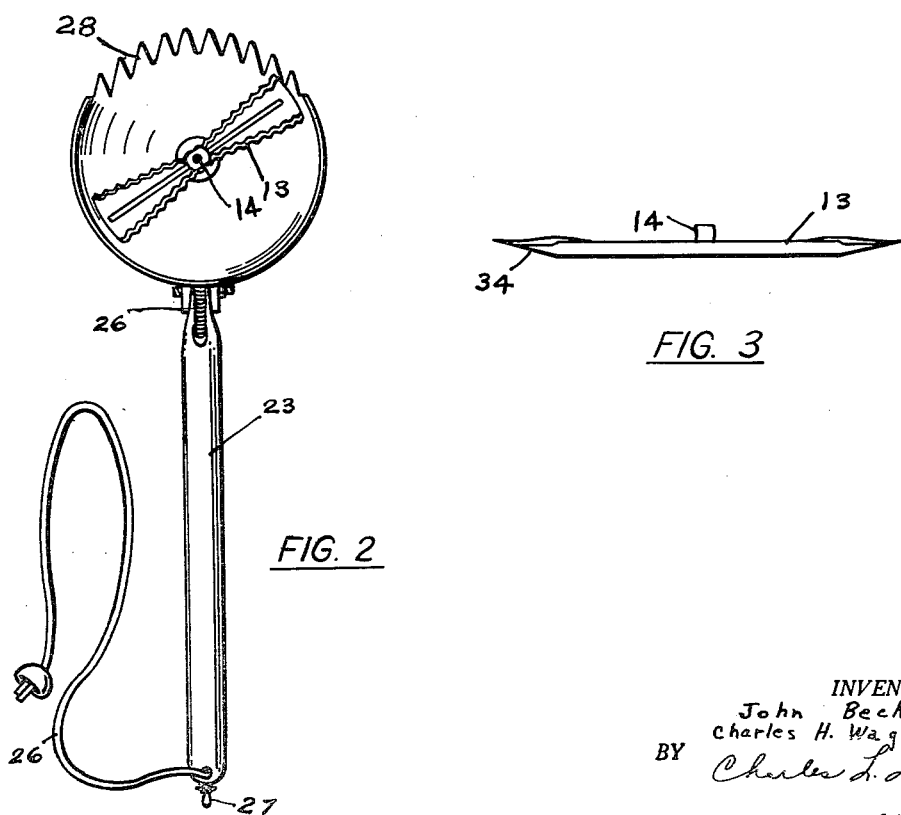
FIG. 2
FIG. 3
INVENTORS
John Becker
Charles H. Wagman
BY Charles L. Loverduck
attorney

United States Patent Office 3,050,854
Patented Aug. 28, 1962

3,050,854
ROTARY HEDGE TRIMMER
John Becker, 3651 Cumberland Road, and Charles H. Wagman, 7840 E. Lake Road, both of Erie, Pa.
Filed Jan. 12, 1961, Ser. No. 82,263
2 Claims. (Cl. 30—276)

This invention relates to portable hedge trimmers and, more particularly, to a rotating blade hedge trimmer.

The present invention discloses an improved combination rotating hedge trimmer and handle, the handle and trimmer combination being so related and the handle so shaped as to make it possible to conveniently trim the tops of hedges as well as to trim alongside the edges of the hedges.

It is, accordingly, an object of the present invention to provide an improved hedge trimmer.

Another object of the invention is to provide an improved blade in combination with a rotatable hedge trimmer.

A further object of the invention is to provide a rotatable hedge trimmer which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is an isometric view of a hedge trimmer according to the invention;

FIG. 2 is a bottom view of the hedge trimmer shown in FIG. 1; and

FIG. 3 is a side view of the blade of the hedge trimmer.

Now with more particular reference to the drawing, a hedge trimmer 10 is shown having a motor 11. The motor 11 has a radially extending flange 29 attached to its lower end which overlies a disk like side flange 16 of a guard member 15. The flange 29 is attached to the flange 16 by means of bolts 18.

The front part of the radial flange 16 extends out beyond the outer periphery of a circumferential flange 17 and has teeth 28 formed thereon. The teeth 28 extend out in a direction generally parallel to a handle 12 and in the same plane as the flange 16. These teeth hold the branches of hedge in position while a blade 13 cuts them off. The blade 13 is attached at its center to a shaft 14 of the motor 11, extends radially outwardly therefrom, and it terminates slightly inside the inner periphery of the flange 17.

The outer handle 12 is generally U-shaped and has legs 22 and 23 connected by an intermediate member 21. An inner handle is made up of a U-shaped member 24 which has legs 29' and 30' and an intermediate member 31. The legs 29' and 30' of the inner handle 24 are fixed between the ends of two brackets 19 by means of bolts 20. A leg 22 of the outer handle 12 is attached to the intermediate member 31 of the inner handle 24 by means of bolts 32. The inner end of the leg 23 is flattened at 33 and is also attached to the leg 29' by means of the bolts 20. The handles 12 and 24 may be made of tubular metallic material.

It will be seen that the legs 22 and 23 extend generally parallel to the flange 16 of the disk like member. The operator can hold the intermediate member 31 in one hand and the other hand can grasp the outer handle 12 near a switch 27. He can, therefore, hold the trimmer firmly in position to cut a level swath along the top of the hedge. He can also hold the hedge trimmer legs 22 and 23 vertically to trim the sides of the hedge.

The blade 13 is wider at the outer ends than at the center. The side edges of the blade 13 are serrated and taper at 34 toward the shaft 14. This makes the blade sever the branches of hedge rather than push them aside.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A hedge trimmer comprising a motor terminating in a flange at one end, said motor having a shaft, a guard, said guard having a disk like part coextensive with said flange and fixed thereto, a flange on said guard, an inner handle attached to said motor, said handle being generally U-shaped and having spaced legs extending generally parallel to said shaft, teeth on the front part of said flange, a rotating blade on said shaft running in a plane parallel to the plane of said guard, and an outer U-shaped handle having one leg thereof attached to the intermediate part of said inner handle and the other end attached to an outer end of one leg of said inner handle.

2. A hedge trimmer comprising a motor terminating in a flange at one end, said motor having a shaft, a guard, said guard having a disk like part coextensive with said flange and fixed thereto, a flange on said guard, an inner handle attached to said motor, said handle being generally U-shaped and having spaced legs extending generally parallel to said shaft, teeth on the front part of said flange, a rotating blade on said shaft running in a plane parallel to the plane of said guard, said guard extending generally parallel to said shaft, said guard terminating at each side of said toothed part, said plane of said blade being adjacent said disk like part, and said blade being a flat, relatively thin member attached at its center to said shaft and having teeth along its edges, having its edges slanted toward said guard, and being wider at its ends than at its center.

References Cited in the file of this patent
UNITED STATES PATENTS

| | | |
|---|---|---|
| 2,149,463 | Orr | Mar. 7, 1939 |
| 2,242,524 | Hunt | May 20, 1941 |
| 2,427,265 | Dreischerf | Sept. 9, 1947 |
| 2,484,753 | Shipley | Oct. 11, 1949 |
| 2,571,455 | Keiper | Oct. 16, 1951 |
| 2,684,532 | Sumstad | July 27, 1954 |
| 2,756,555 | Lewis | July 31, 1956 |